Nov. 7, 1933.  W. C. STATE ET AL  1,934,647

EXTRUDING MACHINE FOR PLASTIC MATERIAL

Filed Dec. 10, 1930   2 Sheets-Sheet 1

Inventors
Will C. State and
Jorgen I. Haase

By Beer Bush
Attorneys

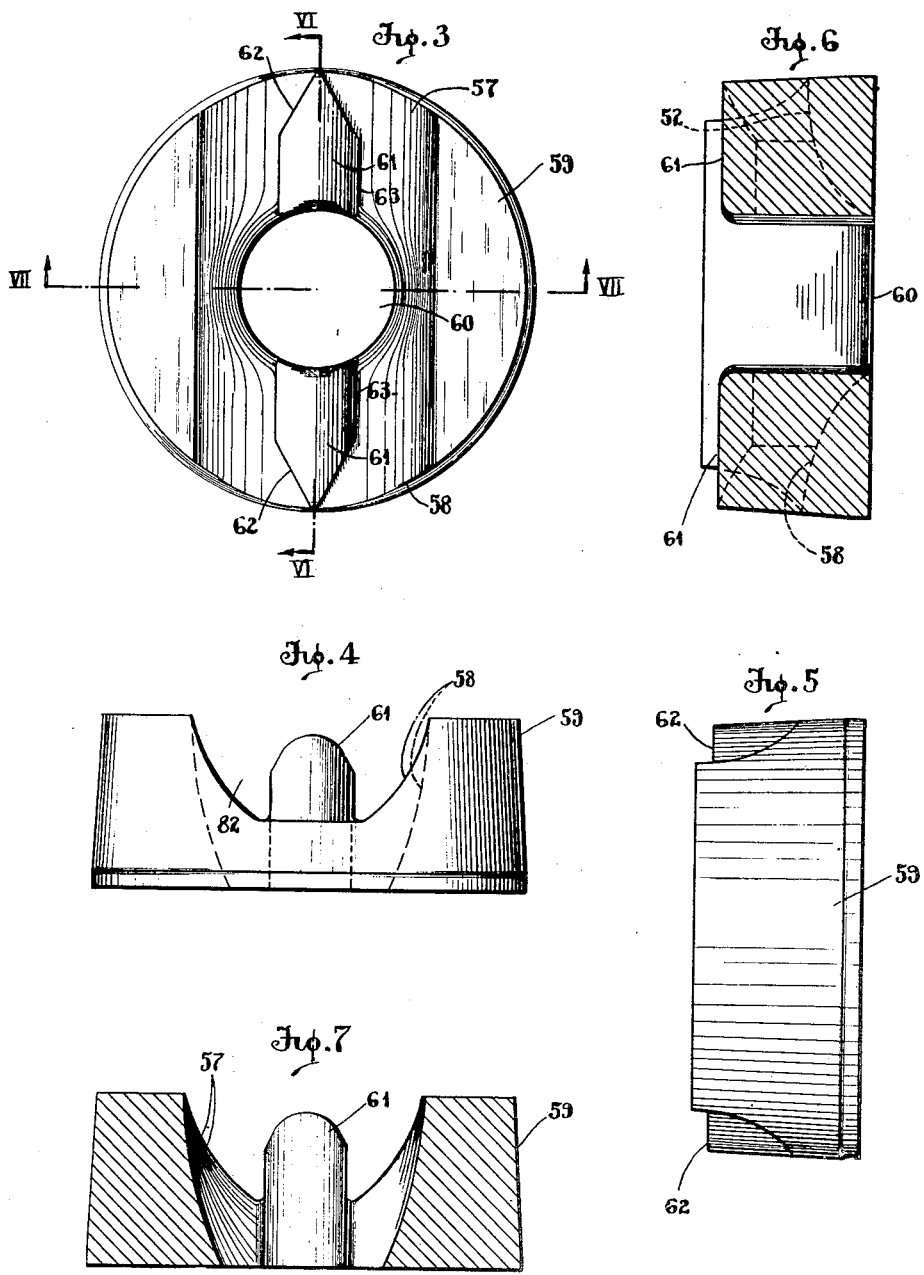

Patented Nov. 7, 1933

1,934,647

UNITED STATES PATENT OFFICE 1,934,647

EXTRUDING MACHINE FOR PLASTIC MATERIAL

Will C. State and Jorgen I. Haase, Akron, Ohio, assignors, by mesne assignments, to Wingfoot Corporation, Wilmington, Del., a corporation of Delaware Application December 10, 1930
Serial No. 501,332

6 Claims. (Cl. 18—13)

This invention relates to machines for manipulating plastic compounds and it has particular relation to machines for continuously forcing rubber compound through a die of suitable configuration.

One object of the invention is to provide an extruding machine for plastic materials which has a materially higher rate of production than machines which have heretofore been employed.

Another object of the invention is to provide an extruding machine for rubber compounds which will permit of a higher rate of extrusion than is obtainable with conventional machines without the generation of excessive heat within the material.

In the manufacture of tread stock for pneumatic tires, pneumatic tubes and similar articles of unvulcanized rubber compounds, it is customary continuously to force the compounds through a die of suitable configuration whereby to impart a desired cross-sectional outline to the articles. This operation generally is performed by means of a screw type conveyor operating in a suitable cylinder and forcing the compound out through the die opening as a continuous strip.

In prior machines employed for this purpose, a die has been disposed upon the forward end of the cylinder in coaxial alignment with the latter. In such machines, the capacity or rate of output was necessarily limited because only a relatively small amount of stock could be forced through the cylinder without generating excessive frictional heat and thus causing scorching or premature vulcanization of the rubber compound which was being extruded. This was true even though the cylinders and the dies in the machines were jacketed and cooling fluid was continuously circulated through the space between the jacket and the cylinder.

This invention contemplates the provision of an extruding machine for rubber compounds in which a plurality of cylinders are capable of continuously feeding rubber compound to a common die which is disposed at an angle with respect to each cylinder. By thus providing the machine with a plurality of cylinders, the amount of compound which must pass through any given cylinder is relatively small. Therefore, excessive frictional heats are not generated in the compound and it is possible thus to obtain a greatly increased rate of output through the die.

For a better understanding of the invention, reference may now be had to the accompanying drawings, forming a part of the specification, of which:

Fig. 3 is a plan view of a deflecting member for directing the flow of rubber compound through the throat of the machine;

Figs. 4 and 5 are elevational views of the member shown by Fig. 3 and taken at right angles to each other;

Figs. 6 and 7 are cross-sectional views taken substantially along the lines VI—VI and VII—VII respectively of Fig. 3.

Figure 1:
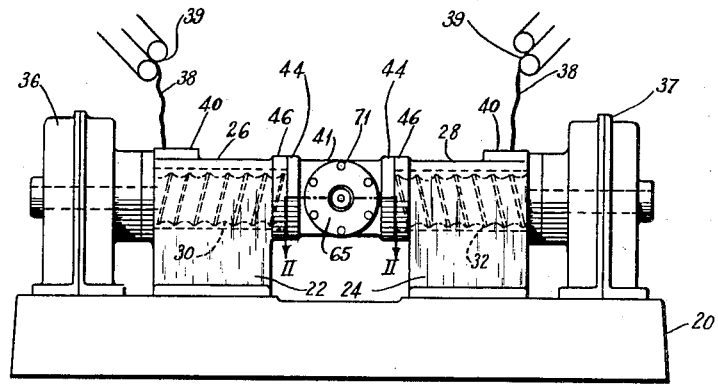
Fig. 1 is a side elevational view of an extruding machine embodying the invention.
Figure 2:
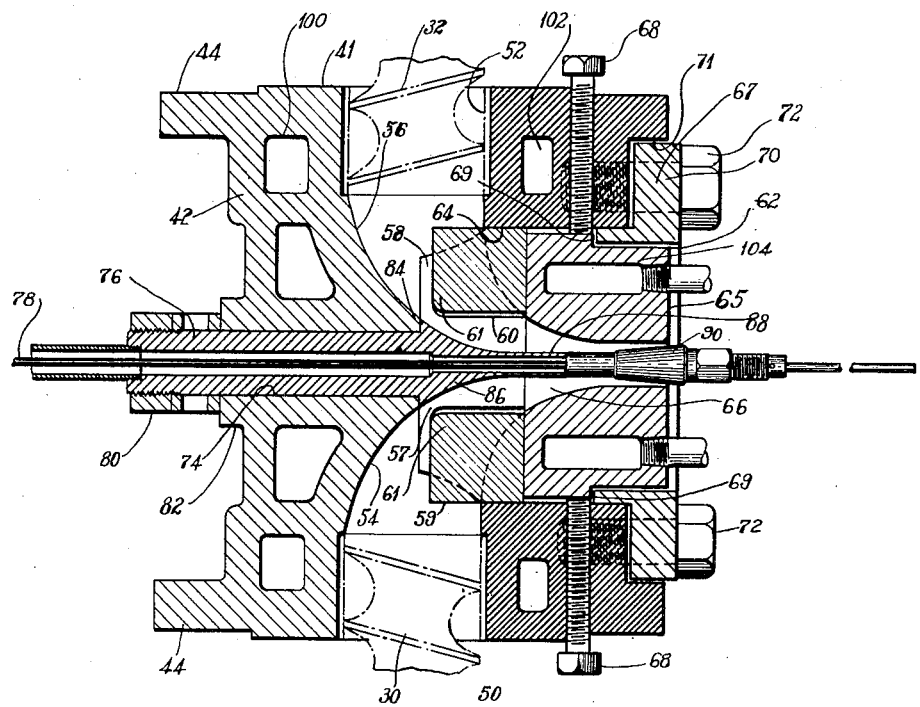
Fig. 2 is a cross-sectional view, on a larger scale, taken substantially along the line II—II of Fig. 1 and disclosing the details of construction of the die and die head employed in the machine.
Figure 8:
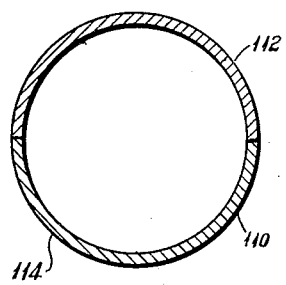
Fig. 8 is a cross-sectional view of a tube extruded from the machine.

In practicing the invention, a base 20 is provided with a pair of spaced pedestals 22 and 24, which support a pair of cylinders 26 and 28 in coaxial alignment with respect to each other. These cylinders contain conveyor screws 30 and 32 which preferably are driven by conventional motors 36 and 37. Rubber compound 38 is fed as strips from conveyors 39 into the cylinders through hoppers 40 and is forced through the cylinders into a die head construction 41 comprising a main body 42. Flanges 44 upon opposite ends of the die head are secured to corresponding flanges 46 upon the opposed ends of the cylinders 26 and 28.

The die head is provided with substantially straight bores 50 and 52 which are disposed in coaxial alignment with the cylinders 26 and 28 and constitute extensions of the bores of the latter. The adjacent ends of the bores 50 and 52 merge into tapering throat portions 54 and 56 which curve inwardly and forwardly in converging relation with respect to each other. The forward walls of the throats are formed by channels 57 and 58 within the rear face of an annulus 59 having a central discharge opening 60, the axis of which is at right angles with respect to the axes of cylinders 26 and 28.

In order to insure the uniform distribution of rubber compound about the entire periphery of the opening 60, a set of baffles 61 are disposed within the channels 57 and 58. These baffles comprise relatively heavy fins having wedge-like portions 62 which face along the axes of the throats. They also have bodies 63 of uniform thickness, which terminate adjacent the exit of the opening 60.

The annulus 59 is suported partially within an opening 64 formed in the die head 42 in such manner that the portions of the channels 57 and 58 adjacent the outer periphery of the annulus are flush with the adjacent portions of the throats 54 and 56, and the forward face thereof contacts with the rear face of a die annulus 65 having a die opening 66. This die annulus is disposed within a sleeve 67 and is of such diameter that the periphery thereof is slightly spaced from the inner periphery of the sleeve. Transverse adjustment of the annulus with respect to the axis of the die opening 66 is secured by means of set screws 68 which extend through threaded openings in the portions of the walls of the die head 42 adjacent the opening 64 and corresponding openings in the sleeve 67 into contact therewith.

Cooperating abutting shoulders 69 formed within the inner periphery of the sleeve 67 and about the outer periphery of the annulus 65, constitute means for preventing axial displacement of the latter. The sleeve is provided at its outer end with a laterally extending attaching flange 70 which seats within a countersink 71 formed about the opening 64. Stud bolts 72 extending through these flanges and into threaded openings within the walls of the die head 41, effectively prevent displacement of the sleeve.

The portion of the rear of the walls of the die head 42 between the throats 54 and 56 is formed with an opening 74 which extends axially and centrally of the die head 42, and receives a tubular mandrel support 76. This support is axially bored to receive a conduit 78 for dispensing soapstone or similar dusting powder. Forward displacement of the support is prevented by means of a nut 80 threaded thereon and abutting a boss 82 upon the wall of the die head. In like manner, rearward displacement is prevented by means of a peripherally extending shoulder 84 upon the support which abuts offset portions in the walls of the throats 54 and 56.

A portion 86 of the support within the throats of the die head is tapered along lines which, at their rear portions, constitute continuations of the curves of the walls of the throats and at their forward portion merge into a cylindrical portion 88. In the manufacture of tubular articles, such as inner tubes, this latter portion supports a mandrel 90 within the die opening 66 and thus causes the formation of the central passages of the tubes. If desired, the die head 42 and the annulus 65 may be formed with passages 100, 102 and 104 through which cooling fluid may be circulated for maintaining proper temperature within the die head.

In the operation of the machine, rubber compound is fed into the cylinders 26 and 28 by means of the belt conveyors 39 and is forced through the latter by means of the conveyor screws 32 and 34 into the forwardly curving passages 54 and 56. The latter direct the compound forwardly through the channels 57 and 58 within the member 59 about the baffles 61 and from there into the die opening 66. The baffles 61 insure the uniform distribution of the compound about the entire periphery of the die opening. Proper centering of the die plate 60 with respect to the mandrel employed for forming the walls of extruded tubes is obtained by regulating or adjusting the positions of the screws 68. If desired, the compound fed to one cylinder may be of different type from that fed to the other. The resultant tube 110 thus obtained is of composite character, the half 112 extruded from one cylinder being of a different compound from the half 114 extruded by the other cylinder.

The two-compound tube forms no part of the present invention, it being disclosed and claimed in a copending application of Wm. Stephens, Serial Number 556,578, filed Aug. 12, 1931.

It is thus apparent that the machine embodying the invention comprises means for extruding rubber compound through a die in which relatively high rates of output may be obtained without generating excessive frictional heat within the compound. Furthermore, the peculiar position of the mandrel which is disposed between the ends of and at right angles to the cylinders 26 and 28 permits that element conveniently to be supported by a suitable support projecting from the rear wall of the die head thus obviating the necessity of employing a spider support which is disposed within the bore of the die and which in machines, as heretofore constructed, has constituted an undesirable impediment to the flow of rubber compound through the latter.

Although I have illustrated only the preferred form of the invention and have described that form in detail, it will be apparent to those skilled in the art that the invention is not so limited but that various modifications may be made therein without departing from the spirit of the invention or from the scope of the appended claims.

What we claim is:

1. A machine for extruding rubber compounds comprising a cylinder, a conveyor screw disposed within the cylinder, a die head secured to the cylinder and having a die opening disposed at an angle to the axis of the cylinder and at one end thereof, and means associated with the die head for extruding rubber compound of uniform thickness about the entire periphery of the die opening, said means comprising a baffle placed to substantially medially divide the rubber extruded through the single cylinder.

2. A machine for extruding rubber compounds comprising a pair of cylinders disposed in coaxial alignment, conveyor screws operating within the cylinders, a die head disposed between adjacent ends of the cylinders and having a die opening extending laterally from the axes of the cylinders, and means comprising a member placed between the die and the ends of the cylinders and having thick distributing guides to substantially divide the material forced through each cylinder into portions and to force the portions formed in one cylinder into engagement with the portions of the material forced through the other cylinder to provide a sharp line of demarcation therebetween.

3. A machine for extruding plastic material comprising a pair of opposed coaxially aligned cylinders, individual conveyor screws operatively disposed in the cylinders, and a die having an opening common to the adjacent ends of the cylinders, a mandrel positioned in the die, said cylinders, mandrel and die having tapered complementary throats curving from the ends of the cylinders and leading to the die opening.

4. A machine for extruding plastic material comprising a pair of opposed coaxially aligned cylinders, individual conveyor screws operatively mounted within the cylinders, a die having an opening common to the adjacent ends of the cylinders, said die having curved and tapered throats leading along continuously curved paths from the ends of cylinders into register with the common die opening, a mandrel disposed in the die opening, and a support for the mandrel disposed transversely with respect to the axes of the cylinders, and being so shaped as to constitute a part of the curved throats.

5. Apparatus for extruding plastic material in tubular form including a die having a substantially circular opening and an inner mandrel, means for forcing one plastic material to and through a part of the die opening, means for forcing another plastic material to and through the remaining portion of the die opening, and means in the path of each material for forcing the different plastic materials together with sharp lines of demarcation therebetween.

6. Apparatus for extruding plastic material including a die, means for forcing one plastic material to and through a part of the die opening, means for forcing another plastic material to and through the remaining portion of the die opening, and means in the path of each material for forcing the different plastic materials together with a sharp line of demarcation therebetween.

WILL C. STATE.
JORGEN I. HAASE.